J. SCHAR.
TRAP FOR GOPHERS, SQUIRRELS, AND THE LIKE.
APPLICATION FILED DEC. 11, 1917.
1,279,453.
Patented Sept. 17, 1918.
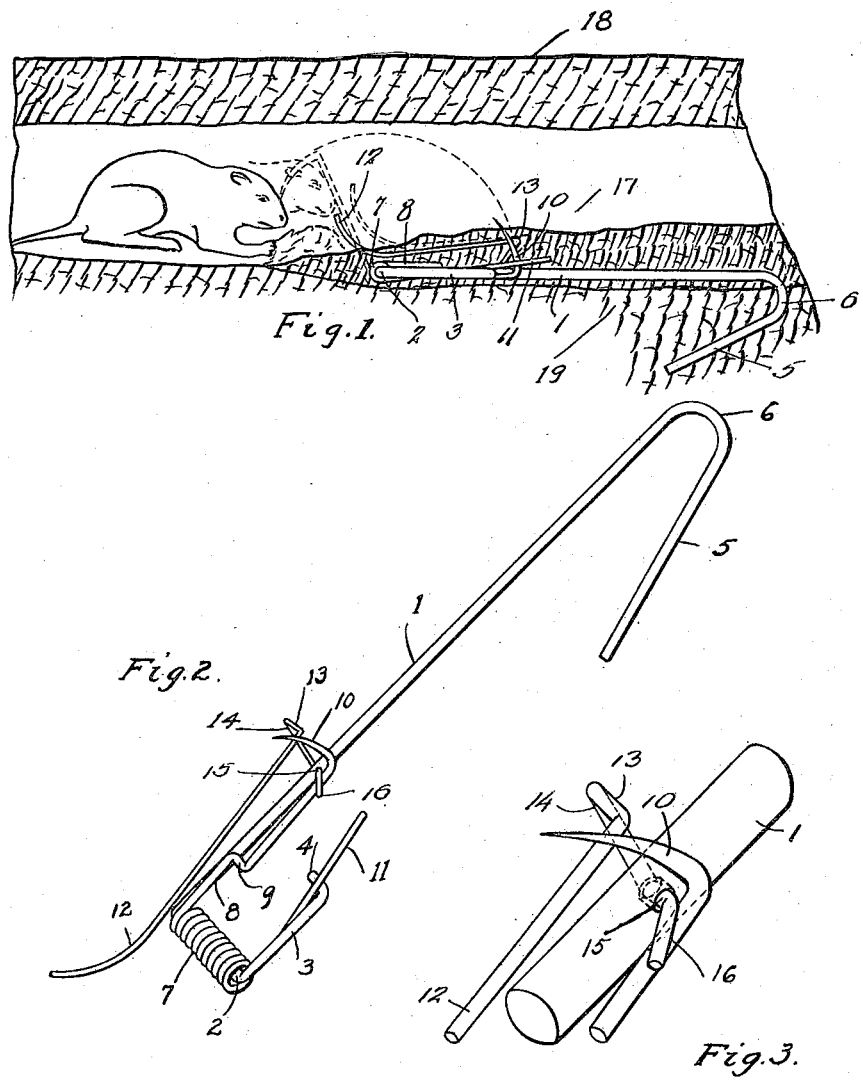
Inventor:
John Schar,
by Hazard & Miller
Attys.

UNITED STATES PATENT OFFICE.

JOHN SCHAR, OF ANAHEIM, CALIFORNIA.

TRAP FOR GOPHERS, SQUIRRELS, AND THE LIKE.

1,279,453.      Specification of Letters Patent.    Patented Sept. 17, 1918.

Application filed December 11, 1917. Serial No. 206,695.

*To all whom it may concern:*

Be it known that I, JOHN SCHAR, a citizen of the United States, residing at Anaheim, in the county of Orange and State of California, have invented new and useful Improvements in Traps for Gophers, Squirrels, and the like, of which the following is a specification.

My object is to make an improved trap for exterminating gophers, squirrels, and the like, and my invention consists in the novel features herein shown, described and claimed.

Figure 1 is a view illustrating a gopher trap embodying the principles of my invention, set in a gopher hole.

Fig. 2 is a perspective upon an enlarged scale of the trap set as it appears removed from the gopher hole.

Fig. 3 is an enlarged fragmentary detail perspective.

The main frame is formed of heavy, stiff wire bent to produce the side bar 1, the spring seat 2 extending from the forward end of the side bar and at right angles, the latch bar 3 extending from the opposite end of the spring seat 2 parallel with the side bar 1, the latch dog 4 extending inwardly from the free end of the latch bar 3 parallel with the spring seat 2, and the stake 5 extending from the opposite end of the side bar 1 and connected thereto by a return bend 6, the stake 5 being divergent from the side bar.

The coil spring 7 is mounted upon the spring seat 2, said coil spring being placed in position before the main frame is completely bent. An arm 8 extends from one end of the spring 7 and has an off-set 9 so as to bring the outer end of the arm substantially parallel with the side bar 1, and a barb 10 extends upwardly from the outer end of the arm 8, said barb being substantially at right angles to the arm 8, slightly curved forwardly and sharpened. An arm 11 extends from the other end of the spring 7 to engage the latch dog 4.

A trigger 12 is formed integral with a wire portion 13 bent outwardly at right angles at the rear end of the trigger, an arm 14 bent downwardly at right angles from the outer end of the portion 13, the journal portion 15 bent laterally at right angles from the lower end of the arm 14 and extending through a bearing in the side bar 1, and the dog 16 extending downwardly and forwardly from the inner end of the journal portion 15.

The portion 13 serves to off-set the rear end of the trigger 12 relative to the arm 14 and to bring the trigger over the side bar 1 and the point of the barb 10 is slightly inclined outwardly over the side bar 1, so that when the trap is set the barb presses against the rear end of the trigger at a distance below its point with the point in the path of the trigger.

Normally the arms 8 and 11 extend in opposite directions. When it is desired to set the trap as in Fig. 1 the outer end of the arm 8 is placed under the dog 16 against the side bar 1, the trigger 12 is depressed to bring the dog 16 to an inclined position with the rear end of the trigger 12 beside the barb 10, then the arm 11 is carried around to compress the spring 7 and said arm is snapped over the locking dog 4 and presses against the locking dog, so that when the animal presses upwardly on the forward end of the trigger 12 which extends beyond the spring 7 the dog 16 will be raised to a position parallel with the side bar 1 and the rear end of the trigger 12 will rise toward the point of the barb and push the barb 10 laterally to disconnect it from the dog 16, allowing the barb to fly forwardly under the tension of the spring. The trap is set in a hole by sticking the stake 5 into the ground so as to support the trap clear of the ground as shown in Fig. 1. It may be set in many positions relative to the gopher hole. Usually the lower part 17 of a gopher hole runs horizontally below the surface 18 of the ground 19. In setting traps of this kind it is usual to dig down from the surface of the ground across the hole 17 and then insert the trap in the hole, bury the trap with light dirt, and fill up the dug-out hole so that when the gopher comes from his nest toward the outlet of his hole he will encounter the trap. The stake 5 is inserted firmly into the ground 19, with the trigger 12 pointing toward the gopher's home, so that when the gopher attempts to come out his nose will strike the trigger 12 and release the barb 10 and said barb will swing over with great force and strike the gopher at the back of his neck.

Various changes may be made in the details of construction without departing from the spirit of my invention as set up in the following claims.

I claim:

1. A gopher trap comprising a wire frame forming a side bar, a spring seat extending from one end of the side bar at right angles, a latch bar extending from the other end of the spring seat parallel with the side bar, a latch dog extending from the free end of the latch bar parallel with the spring seat, a return bend at the opposite end of the side bar from the spring seat, a stake extending from the return bend, a coil spring upon the spring seat, a barb connected to one end of the coil spring, an operating arm extending from the other end of the coil spring to engage the latch dog, a trigger, a journal on the trigger in a bearing extending from the trigger through the side bar, and a dog rigid with the journal for holding the barb in its withdrawn position.

2. A gopher trap comprising a wire frame forming a side bar, a spring seat extending from one end of the side bar at right angles, a stake extending from the other end of the side bar, the stake being connected to the side bar by a return bend and the stake being divergent from the side bar, a coil spring upon the spring seat, means for holding one end of the coil spring, a barb connected to the other end of the coil spring, a trigger, a journal on the trigger in a bearing extending from the trigger through the side bar, and a dog rigid with the journal for holding the barb in its withdrawn position.

In testimony whereof I have signed my name to this specification.

JOHN SCHAR.

Copies of this patent may be obtained for five cents each, by addressing the "Commissioner of Patents, Washington, D. C."